Figure 1:
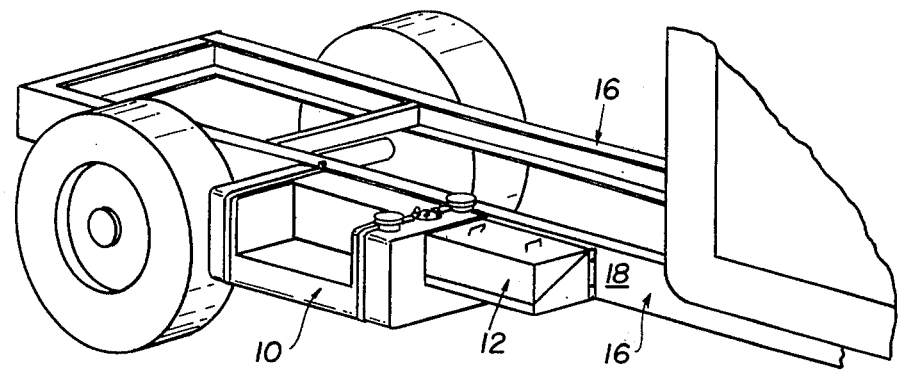

United States Patent [19]

Berger

[11] 4,013,300
[45] Mar. 22, 1977

[54] FUEL TANK AND BATTERY COMBINATION STRUCTURE

[76] Inventor: Allan H. Berger, 2711 Kismet Lane, Houston, Tex. 77043

[22] Filed: Aug. 18, 1975

[21] Appl. No.: 605,641

[52] U.S. Cl. .............................. 280/5 A; 180/68.5
[51] Int. Cl.² .................. B60K 15/00; B60K 15/04
[58] Field of Search ............ 280/5 R, 5 A; 180/68.5

[56] References Cited

UNITED STATES PATENTS

| | | | |
|---|---|---|---|
| 2,109,316 | 2/1938 | Harley | 180/68.5 X |
| 2,758,845 | 8/1956 | Doyle et al. | 280/5 A |

FOREIGN PATENTS OR APPLICATIONS

| | | | |
|---|---|---|---|
| 1,087,028 | 11/1960 | Germany | 180/68.5 |
| 539,797 | 2/1956 | Italy | 280/5 A |
| 170,658 | 7/1934 | Switzerland | 280/5 A |

Primary Examiner—Robert R. Song
Assistant Examiner—John A. Pekar
Attorney, Agent, or Firm—Bauer, Amer & King

[57] ABSTRACT

A refuse truck fuel tank shaped to provide, not only an internal fuel storage compartment, but also an external battery-receiving compartment. Thus, for non-tilting bodies, the usual side-by-side positions of the fuel tank and battery (or battery box) suffice and are provided; however, for body types tilted by hydraulic cylinders, adequate room for said cylinders is created by a compact positional arrangement in which the fuel tank is supported in enclosing relation about the battery, i.e. the latter is allowed to project within said fuel tank external battery-receiving compartment, thus significantly lessening the mounting space requirements for said fuel tank and battery.

2 Claims, 3 Drawing Figures

U.S. Patent  Mar. 22, 1977  4,013,300

FUEL TANK AND BATTERY COMBINATION STRUCTURE

The present invention relates generally to improvements in the mounting of the fuel tank and battery box (and/or batteries) for refuse trucks, the improvements more particularly providing an option in the positional arrangement of these components that can be exercised economically, without difficulty, and in accordance with the mounting space available for these and other essential components for the truck.

As generally understood, refuse bodies are mounted on truck chassis and are available in various models having various operational modes. For example, the refuse truck chassis can be equipped with a tilting body, or with a body that is bolted to the chassis. With the former, frame-mounted hydraulic lifting cylinders are provided to tilt or raise the refuse body and in this way facilitate emptying of the contents thereof, whereas the stationarily mounted body more typically may be a front-end loader, rear-end loader, load lugger, and certain side-loader bodies, and do not require tilting or lifting for emptying purposes. In any event, the selection of the varying body designs and chassis frame clearance requirements are decisions which are sometimes not made until after the purchase of the truck chassis from the truck manufacturer. This, in practice, results in the refuse operator having the additional expense of relocating fuel tanks and battery boxes from their locations as supplied by the truck manufacturer to other locations for proper body mounting. Further, the existing shapes and embodiments of fuel tanks and battery boxes (and/or batteries) do not particularly facilitate any optional positional arrangements of these components. In fact, existing designs require special fixtures and mounting structure to achieve any change in position or location of these components, as well as requiring the services of mounting specialists.

Broadly, it is an object of the present invention to provide an improved fuel tank shape and design which readily allows for optional positions thereof with respect to the battery or battery box of the refuse truck body, and in other ways as well overcomes the foregoing and other shortcomings of the prior art. Specifically, it is an object of the present invention to provide a fuel tank which, when required, can be mounted in compact relation to the battery or battery box, thereby providing additional mounting area for other components of the truck, such as the hydraulic lifting cylinders for a refuse truck tilting body.

A fuel tank and battery combination structure demonstrating objects and advantages of the present invention is one, which as already indicated, provides either one of two mounting positions for the fuel tank relative to the battery. To achieve this, the fuel tank hereof comprises walls which cooperate to circumscribe a generally rectangular volume. More particularly, these walls are arranged relative to each other so as to bound within the volume an internal fuel storage compartment and also an external battery-receiving compartment. As a consequence, when there is adequate mounting space, the fuel tank and battery or battery box can be mounted in their conventional side-by-side positions. On the other hand, when additional mounting space for other components of the truck, such as the hydraulic mounting cylinders, must be provided, the fuel tank hereof is mounted in enclosing relation about the battery or, stated another way, the battery is allowed to project within the external battery-receiving compartment of the fuel tank, this positional arrangement of these components thereby contributing to a compact or minimum mounting area required for these components.

Figure 2:
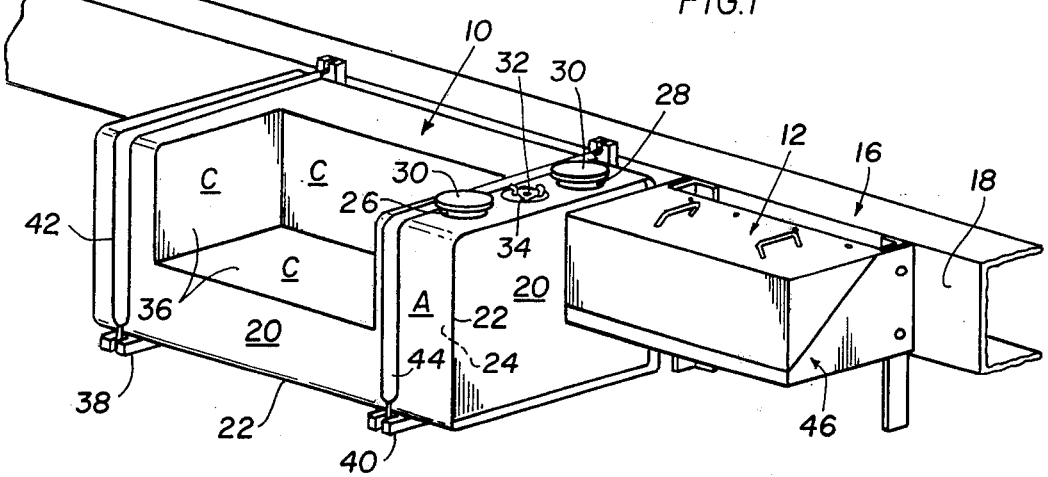
Figure 3:
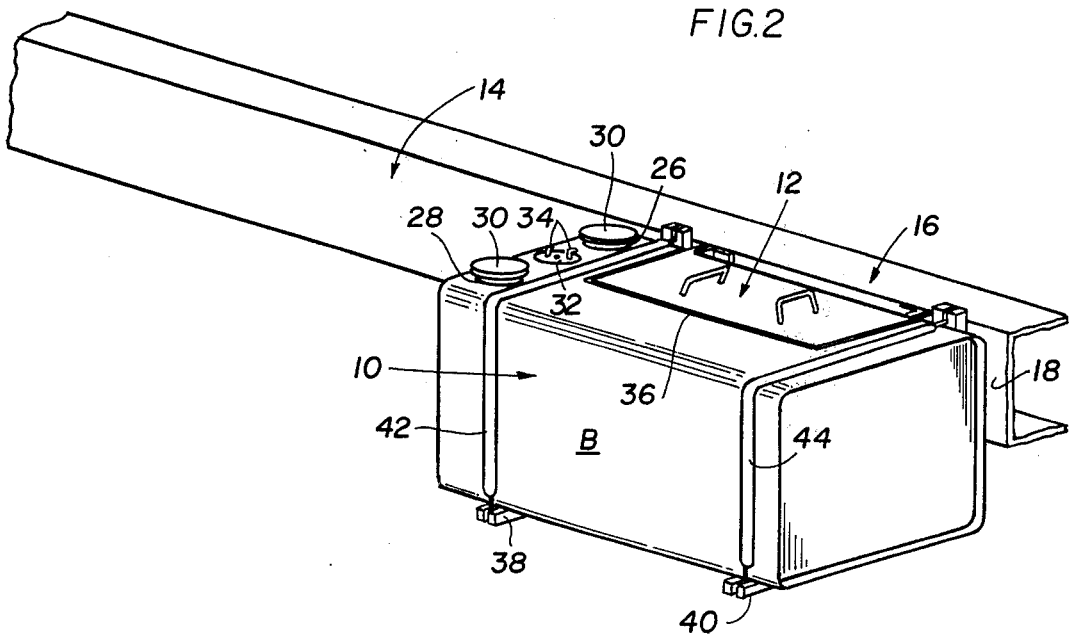

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a perspective view of a truck chassis and of the improved fuel tank hereof, the latter being shown in one positional arrangement with the battery and/or battery box for the truck; and FIG. 2 is a perspective view, on an enlarged scale, of the positional arrangement of the fuel tank hereof and of the battery box in which further structural details are more readily discernible; and FIG. 3 is a perspective view of another significant fuel tank and battery box positional arrangement according to the present invention.

Reference is now made to the drawings in which select optional positional arrangements are demonstrated, particularly in FIGS. 2 and 3, for an improved fuel tank of the present invention, generally designated 10, and a cooperating battery or battery box 12. More particularly, the arrangement of FIG. 2 for convenience can be characterized as the "side-by-side" arrangement, and finds application on any chassis, particularly of a refuse truck, that is carrying a non-tilting body, i.e. a body that is bolted to the truck chassis at both the front and rear of the body. As generally understood, this would include front-end loader, rear-end load, load lugger, and certain side-loader bodies.

On the other hand, the fuel tank-battery arrangement 10, 12 of FIG. 3 can be conveniently referred to as the "nesting" arrangement wherein the battery or battery box 12 is enclosed in a fuel tank cavity, as will be subsequently explained in greater detail, thereby providing the compact arrangement of these two components that is illustrated in FIG. 3. Said nesting arrangement has application on a refuse truck chassis that is equipped with any one of several models of tilting bodies. This would include the "Dempster Dinosaur," hydraulic roll-off equipment, cable driven tilt frame equipment, and any other refuse body that is lifted by frame-mounted hydraulic lifting cylinders. In this regard, the compact arrangement of FIG. 3 results in the additional space or area, herein generally designated 14, which as may be appreciated by examination of FIG. 2 is not available in the FIG. 2 side-by-side arrangement. Area 14 is thus available for the advantageous location of the referred to frame-mounted hydraulic lifting cylinders. Thus, the two optional fuel tank-battery arrangements 10, 12 illustrated in FIGS. 2 and 3 constitute the crux of the invention, and the structural features of the components 10 and 12 which provide these optional positional arrangements will now be specifically described.

More particularly, as illustrated in FIG. 1, the typical truck chassis includes longitudinally oriented support frame members 16 on which various models of bodies having the various modes of operation as described above are mounted in accordance with well understood techniques. As illustrated in the drawings, the typical frame member 16 has a vertically oriented surface 18 which in practice is utilized for support of the fuel tank 10 and battery box 12 thereon.

Fuel tank 10 in accordance with the present invention is comprised of a plurality of walls which cooperate to circumscribe a generally rectangular volume. More particularly, in accordance with the present invention, said walls, individually and collectively designated 20, except as otherwise specifically identified, are joined to each other, as along edges, individually and collectively designated 22, so as to bound an internal storage compartment for fuel, herein designated 24. In this connection, functioning as inlets to the internal fuel storage compartment 24 are two openings 26 and 28, said inlet opening 26 being adjacent side wall A of the tank 10 (see FIG. 2), and inlet opening 28 being adjacent wall B (see FIG. 3). Functioning as closures for the inlet openings 26 and 28 are filler cap members 30. At an interposed central position between the inlet openings 26 and 28 is an outlet opening 32 having appropriate outlet connections 34 therein for the flowing of the fuel from the internal storage compartment 24 to the truck motor. The significance of the two inlet openings 26 and 28 and of the centrally located outlet 32 will soon be apparent.

Continuing with the description of the improved fuel tank 10 hereof, it will be noted that the walls 20 also cooperate to delineate, in the general rectangular volume occupied by the fuel tank, an external compartment, herein generally designated 36. More specifically, as clearly illustrated in FIG. 2, the fuel tank walls C cooperate to bound the external compartment 36 which in one of the positional arrangements is adapted to receive therein the battery box 12 and thereby contribute to the compactness or minimum area occupied by the components 10, 12.

For completeness sake, it should be noted that in FIG. 2, fuel tank 10, as just described, is appropriately mounted in supported position on the support surface 18 by laterally extending support L-shaped brackets 38, 40 and by cooperating mounting members 42, 44 which may consist of straps with bolt ends. In the side-by-side arrangement of FIG. 2, battery-support structure 46 is appropriately bolted or otherwise connected to the support surface 18, and the battery box cover or batteries 12 positioned thereon, to thereby provide the side-by-side arrangement illustrated in FIG. 2.

Referring now to FIG. 3, it will be assumed that the body selected and the operational mode thereof, by virtue of requiring hydraulic lifting cylinders (not shown), dictates providing the additional area 14 for the mounting of the cylinders. Thus, to convert from the fuel tank-battery arrangement 10, 12 of FIG. 2 to that illustrated in FIG. 3, all that is necessary is to remove fuel tank 10 from its position adjacent to battery 12 as illustrated in FIG. 2. Upon this removal, the brackets 38, 40 are then mounted in straddling relation to the battery box 12 on the support surface 18. Fuel tank 10 is then turned 180 degrees from its orientation as illustrated in FIG. 2, so that battery-receiving compartment 36 is in facing relation to the support surface 18. As a result, fuel tank 10 can be moved adjacent the support surface 18 with the battery box 12 projected within the battery-receiving compartment 36. At this time fuel tank 10 is then supported on the support frame 16 in enclosing relation about the battery box 12, using the mounting structures 38, 40, 42 and 44, all in a well understood manner.

In the nesting arrangement of FIG. 3, the fuel tank compartment opening 28 is of course used in the filling of the fuel tank 24 since by its location it is the one most accessible. On the other hand, in the FIG. 2 tank-battery arrangement, the fuel storage compartment inlet 26 is the one used. In either of the two fuel tank-battery arrangements of FIGS. 2 and 3, the central location of the outlet 32, 34 remains unchanged, and therefore does not require any modification or changes in the conduits or hoses that are utilized to flow the fuel from the tank 10 to the truck motor.

It will of course be understood that conventional mounting requirements for the fuel tank 10 and battery box 12 will be provided. For example, in order to have proper access to these components, whether one or the other of the side-by-side or nesting arrangements of FIGS. 2 or 3 is utilized, it will be understood that these components will be mounted with sufficient clearance below the top of the truck frame to allow for removal of the batteries when the need arises, and that similarly appropriate access clearance will be provided for maintenance repairs and the like to be made to the fuel tank 10.

From the foregoing description it should be readily appreciated that there has been described herein an improved fuel tank 10 which contributes to noteworthy positional arrangements with respect to a battery or battery box in accordance with the space requirements that are available for the various different models and operational modes of truck bodies, particularly for refuse trucks.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. A fuel tank and battery combination mountable in select arrangements dictated by space requirements on a truck chassis having a vertically oriented support frame surface, said fuel tank comprising walls cooperating to circumscribe a generally rectangular volume, said walls being arranged relative to each other so as to bound within said volume an internal fuel storage compartment and also an external battery-receiving compartment opening into two adjacent side walls of said fuel tank, said fuel tank-battery arrangements comprising means mounting said battery to extend laterally of said supporting frame surface, and means to support said fuel tank from said supporting frame surface either in adjacent position to said battery with said external battery-receiving compartment thereof in an outwardly facing relation to said support surface or in a space-saving operative position in relation to said battery, said space-saving operative position being provided by movement of said fuel tank through a 180 degree rotational traverse to reorient said external battery-receiving compartment thereon into an inwardly facing relation to said support surface and disposing said fuel tank such that said laterally extending battery is projected within said fuel tank external battery-receiving compartment and said fuel tank is in enclosing relation thereabout, whereby there is an option available in the selection of the positional arrangement of said battery and fuel tank according to the available mounting space for same.

2. A fuel tank and battery combination as defined in claim 1 wherein said fuel tank has two inlets disposed in spaced apart relation on one of said side walls of said fuel tank so that one said fuel inlet is available for use in each position of said fuel tank, and a centrally located outlet on said fuel tank between said inlets, whereby said central outlet is available for use in any position of said fuel tank.

* * * * *